2,894,086

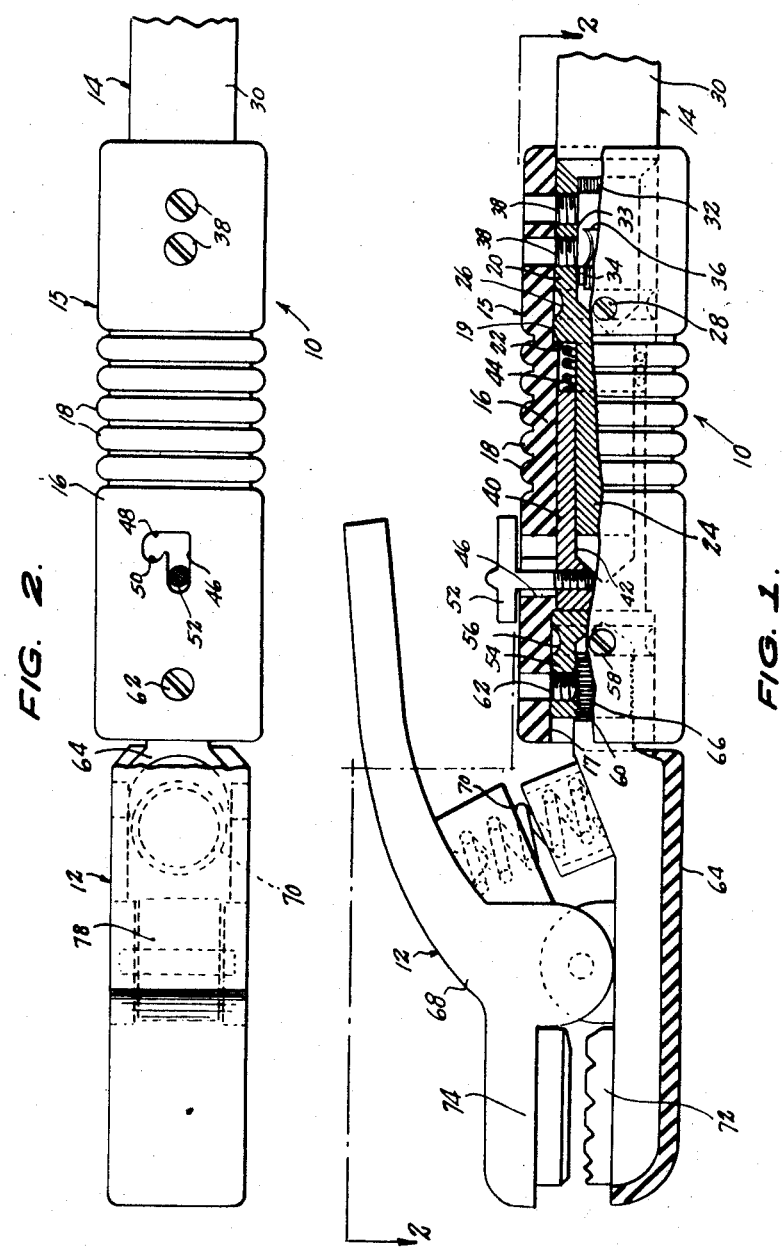

ARC WELDING ELECTRODE HOLDER WITH SAFETY SHUTOFF

Floyd R. Rizer, Detroit, Mich., assignor of twenty percent to Leo Vigne, Detroit, Mich.

Substituted for abandoned application Serial No. 500,132, April 8, 1955. This application November 29, 1957, Serial No. 699,803

3 Claims. (Cl. 200—51)

This invention relates to arc welding apparatus, and more particularly has reference to an improved holder for an arc welding electrode having a safety shutoff which can be readily manipulated by a worker to break contact between the electrode and a welding machine. Generally, it is necessary that an arc welding electrode handle, when temporarily not in use, be deposited upon electrically insulative material, or at least, upon a support that is not grounded to the parent metal on which the welding operations are being performed, since when put down on a metal surface, a contact may be made, causing a flash from the welding rod.

In many instances, it is difficult to find a nearby place on which the device can be deposited without causing a flash of the type referred to, and this is particularly true, for example on ships, since all of the metal is grounded. The main object of the present invention, accordingly, is to provide a generally improved arc welding electrode holder which includes a safety shutoff, conveniently located on the electrode holder, so that a worker can, by simple adjustment of the position of a switch button, break the welding current circuit through the holder, thus to permit the holder and electrode to be laid down on any nearby surface without danger of causing a flash.

Another object of a more specific nature is to provide a device as described in which there is a particular formation of insulating sleeve, cable attaching element, sliding contact, and jaw holding element, forming the handle of the device, the particular construction being such as to provide for sure operation of the contact breaking means in every instance, and being further adapted to insure the ready disassembly of the component parts of the handle.

Still another object of importance is to provide a device as described in which the construction, though being quite rugged, is, nevertheless, simple and capable of manufacture at a minimum of cost.

Other objects will appear from the following description, the claims appended thereto, and from the annexed drawing, in which like reference characters designate like parts throughout the several views, in which:

Figure 1 is a fragmentary side elevation, partly in longitudinal section, of an electrode holder formed according to the present invention; and Figure 2 is a fragmentary top plan view of the device as seen from the line 2—2 of Figure 1.

The illustrated electrode holder constituting the present invention has been generally designated at 10, and comprises a jaw assembly generally designated at 12. An insulated electric cable, generally designated at 14, is detachably connected to the holder.

The holder 10 further comprises a handle portion 15 having an elongated, thick walled sleeve 16 of electrically insulated material, having an axial bore 17 opening through the opposite ends of the sleeve. Intermediate its ends the exterior surface of the sleeve can, as shown, be provided with circumferentially extending, closely spaced corrugations 18 defining a roughened surface on the sleeve to facilitate maintaining a sure grip thereon.

In the rear end of the bore 17 of the sleeve there is inserted an electrically conductive cable securing element 20 formed intermediate its ends with a circumferential shoulder 22 engaging against an internal shoulder 19 formed upon the wall of the bore of sleeve 16. Forwardly of shoulder 22, element 20 has a reduced axial extension 24.

The element 20 is formed, adjacent shoulder 22, with a circumferential external grove 26, and threaded through the wall of sleeve 16 into groove 26, to securely engage the element 20 within the bore of the sleeve, is a set screw 28.

Cable 14 which includes an electrically insulative cover 30 extends into the rear end of the sleeve bore 17, and projecting forwardly from the inserted end of the cable 14 is an uncovered electrically conductive portion 32 of the cable, which extends into an axial socket 33 of element 20. A longitudinally extending shim 34 is positioned upon the cable portion 32 and wrapped around said shim and the portion 32 is an elongated, thin gauged, electrically conductive shim element 36, which is engaged by set screws 38 threaded radially inwardly through the wall of element 20, thus to hold the cable 14 assembled with said element. By backing off the screws 38, the cable is loosened within the socket 33, to permit detachment of the cable from the holder for any desired purpose without necessity of disassembling the holder itself.

In the intermediate portion of the bore 17 of the sleeve 16 there is mounted, for longitudinal sliding movement, a tubular cylindrical bushing 40 of electrically conductive material, having an axial socket 42 in which is snugly and slidably engaged the reduced extension 24 of the element 20. A helical spring 44 is coiled about the extension 24 and is compressed between the shoulder 22 and the adjacent end of the bushing 40, thus exerting continuous forward pressure against the bushing 40 tending to shift the same to the left in Figure 1.

Formed in a forward part of the wall of the sleeve 16 is a short, longitudinal slot 46 communicating with the bore 17 thereof. Slot 46, as shown in Figure 2, has at its rear end a short lateral extension 48, said extension 48 being in turn formed, at the outer end thereof, with a notch 50, so that the slot 46, extension 48, and notch 50 cooperate to define a J-shaped opening in the sleeve, receiving the shank 51 of a switch handle 52 overlying the outside of the sleeve 16, the shank 51 having threads engaging with threads formed in a radial opening provided in the bushing 40, thus to fixedly connect the switch handle 52 to the bushing 40. It will be understood that normally, the spring 44 urges the bushing 40 to the forward position thereof shown in Figure 1, but against the resistance of the spring. The switch handle 52 can be shifted rearwardly, or to the right, in Figures 1 and 2, and then moved into slot portion 48 in the notch 50. Then, upon release of the switch handle, the spring 44 will expand to a slight extent, and cause the switch handle to engage in the notch 50, thus to lock the switch handle against movement in a circumferential direction in respect to the sleeve 16. With the bushing 40 in the rearward position shown in Figure 1, the bushing is held out of contact with a jaw assembly mounting element 54. The element 54 is of electrically conductive material, and is cylindrically shaped, fitting snugly within the forward end of the bore 17 of the sleeve 16. Formed in the element 54 is a circumferential groove 56 in which is engaged the inner end of a set screw 58 threadable radially inwardly through the wall of the sleeve 16 to hold the element 54 detachably, but fixedly assembled with the sleeve.

The element 54 is formed with an axial threaded bore 60 opening through the forward end of the element, and formed in the element 54 is a threaded radial opening in which is engaged a set screw 62 which engages the threaded boss 66 on a stationary jaw 64, the boss 66 being threaded in the bore 60, with the set screw 62 locking the boss 66 fixedly in the bore 60 of the element 54.

A pivoted jaw 68 is mounted upon the fixed jaw 64, and a spring 70 is held under compression between the respective jaws to normally urge the pivoted jaw 68 to a closed position. Jaw inserts 72, 74 are carried by the jaws 64, 68 respectively.

It will be seen that in use, with the switch handle 52 disposed in the position shown in Figure 2, spring 44 is free to expand, thus causing the contact bushing 40 to slide to the left upon the reduced extension 24 of element 20, into contact with the rear end of the conductive element 54. As a result, a circuit is closed through the device, permitting use of the tool for welding.

If it is desired to shut off the flow of electrical current through the device, it is merely necessary that the switch handle 52 be manipulated in the manner previously described herein, to retract bushing 40 and cause the same to move out of contact with the element 54. The device can then be laid down on any nearby surface, whether grounded to the work or not, and there will no possibility of arcing or flashing under such circumstances.

Further, the device is so formed as to facilitate the attachment or detachment of a jaw assembly or of an associated cable. It is merely necessary that the set screws 62 or 38, as the case may be, be backed off, to permit the jaw assembly or the cable to be removed bodily from the tubular holder. Still further, the element 54 and the element 20 can both be removed from the sleeve with ease, by backing off the screws 58, 28 respectively, and on removal of these parts and threading of the switch handle shank out of the bushing 40, said bushing can also be removed. The entire tool is thus capable of being assembled or disassembled, with maximum ease and facility, thus to lower to a maximum extent the cost of manufacture thereof, while at the same time, providing an efficiently operating tool which will be rugged, and trouble-free in operation when used over a long period of time.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

This application is a substitute of application Serial No. 500,132, filed April 8, 1955.

What is claimed is:

1. In a welding device, a handle portion comprising an insulated tubular sleeve having forward and rearward ends, said sleeve having an axial bore opening through said ends, a cable securing element engaged in said bore at the rear end of the sleeve, means locking said cable securing element in place, said securing element having a reduced axial extension projecting forwardly therefrom, an annular shoulder on said securing element between said element and said extension, a conductive contact bushing slidably engaged in the sleeve bore in front of the securing element, said bushing having a forward end and a rearward end, the rearward end of the bushing having an axial socket slidably receiving said extension, a helical spring circumposed on said extension and compressed between said shoulder and the rearward end of the bushing and urging said contact bushing forwardly, and conductive jaw mounting element secured in the sleeve bore in front of said contact bushing and normally contacted by the forward end of the contact bushing.

2. In a welding device, a handle portion comprising an insulated tubular sleeve having forward and rearward ends, said sleeve having an axial bore opening through said ends, a cable securing element engaged in said bore at the rear end of the sleeve, means locking said cable securing element in place, said securing element having a reduced axial extension projecting forwardly therefrom, an annular shoulder on said securing element between said element and said extension, a conductive contact bushing slidably engaged in the sleeve bore in front of the securing element, said bushing having a forward end and a rearward end, the rearward end of the bushing having an axial socket slidably receiving said extension, a helical spring circumposed on said extension and compressed between said shoulder and the rearward end of the bushing and urging said contact bushing forwardly, a conductive jaw mounting element secured in the sleeve bore in front of said contact bushing and normally contacted by the forward end of the contact bushing, said sleeve having a side wall provided with slot means communicating with the sleeve bore, said slot means comprising a longitudinal slot portion extending lengthwise of the sleeve and having forward and rearward ends, a lateral slot portion extending crosswise of the sleeve from the rear end of said longitudinal slot portion, a shank extending radially through said slot means, said shank having an inner end secured to said conductive contact bushing and an outer end, and a handle on the outer end of the shank positioned exteriorly of said sleeve, said shank normally engaging the forward end of the longitudinal slot portion with the forward portion of said bushing contacting said mounting element, said shank and said bushing being retractable rearwardly and laterally by means of said handle and against the resistance of said spring to position said shank in said lateral slot portion and hold the contact bushing rearwardly out of contact with said mounting element.

3. In a welding device, a handle portion comprising an insulated tubular sleeve having forward and rearward ends, said sleeve having an axial bore opening through said ends, a cable securing element engaged in said bore at the rear end of the sleeve, means locking said cable securing element in place, said securing element having a reduced axial extension projecting forwardly therefrom, an annular shoulder on said securing element between said element and said extension, a conductive contact bushing slidably engaged in the sleeve bore in front of the securing element, said bushing having a forward end and a rearward end, the rearward end of the bushing having an axial socket slidably receiving said extension, a helical spring circumposed on said extension and compressed between said shoulder and the rearward end of the bushing and urging said contact bushing forwardly, a conductive jaw mounting element secured in the sleeve bore in front of said contact bushing and normally contacted by the forward end of the contact bushing, said sleeve having a side wall provided with slot means communicating with the sleeve bore, said slot means comprising a longitudinal slot portion extending lengthwise of the sleeve and having forward and rearward ends, a lateral slot portion extending crosswise of the sleeve from the rear end of said longitudinal slot portion, a shank extending radially through said slot means, said shank having an inner end secured to said conductive contact bushing and an outer end, and a handle on the outer end of the shank positioned exteriorly of said sleeve, said shank normally engaging the forward end of the longitudinal slot portion with the forward portion of said bushing contacting said mounting element, said shank and said bushing being retractable rearwardly and laterally by means of said handle and against the resistance of said spring to position said shank in said lateral slot portion and hold the contact bushing rearwardly out of contact with said mounting element, said lateral slot portion having a notch in which said shank is engageable so as to preclude vagrant movement of said shank out of said lateral slot portion into said longitudinal slot portion.

References Cited in the file of this patent

UNITED STATES PATENTS

| | | |
|---|---|---|
| 1,865,003 | Hall | June 28, 1932 |
| 1,883,807 | McIntire | Oct. 18, 1932 |